Aug. 23, 1932.  W. A. EDWARDS  1,873,320
SUCTION PRODUCING MEANS FOR SUCTION OPERATED MOTORS
Filed May 11, 1931
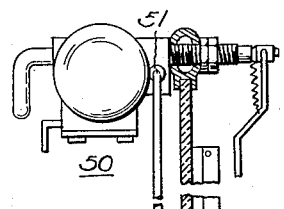
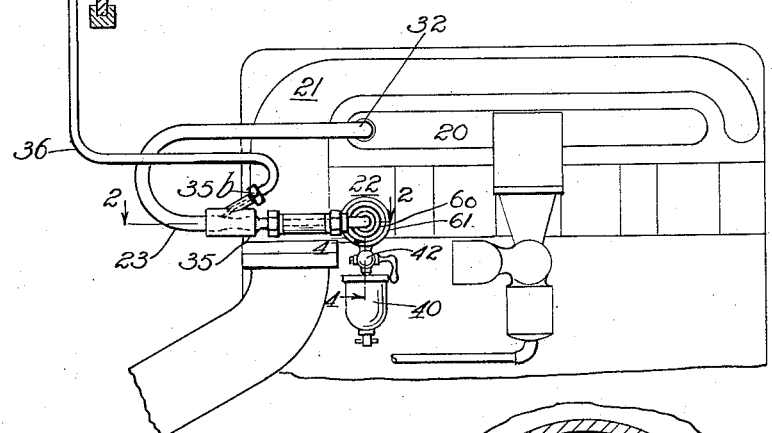
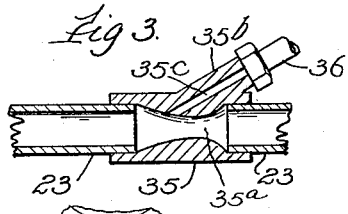
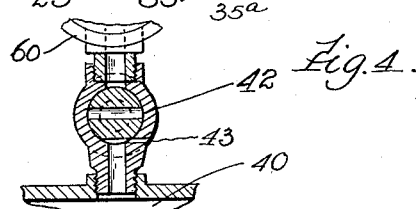
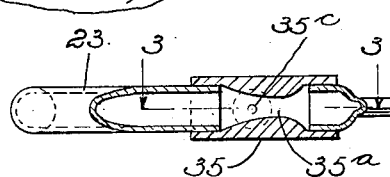
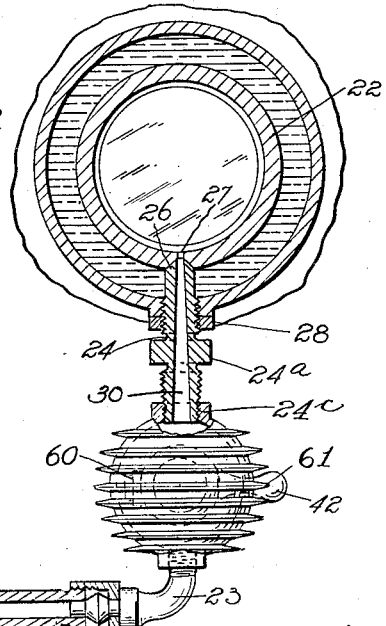
Inventor
William A Edwards
by Burton & Burton
his Attorneys.
Witness
H. G. McKnight Patented Aug. 23, 1932

1,873,320

UNITED STATES PATENT OFFICE

WILLIAM A. EDWARDS, OF CHICAGO, ILLINOIS, ASSIGNOR OF ONE-HALF TO CHARLES S. BURTON, OF CHICAGO, ILLINOIS

SUCTION-PRODUCING MEANS FOR SUCTION-OPERATED MOTORS

Application filed May 11, 1931. Serial No. 536,455.

The purpose of this invention is to provide a construction in connection with an internal combustion engine for utilizing engine pressures for operating a suction-operated motor of an auxiliary device associated with the apparatus or mechanism operated or served by the engine, particularly auxiliary devices on a motor vehicle, the construction being specially designed for operating a small suction-operated motor of the sort commonly provided for operating a windshield wiper, and which have heretofore been operated by engine suction derived by connection of the windshield wiper motor with the intake manifold of the engine.

In the use of these familiar windshield wiper motors it has been found that with a suction-operated motor of suitable size to utilize no more of the suction derivable from the intake manifold of the engine than can be so utilized without materially impairing the action of the engine, while the wiper is properly operative under ordinary conditions, yet when the weather conditions cause the windshield glass to be coated with snow and ice, opposing the movement of the wiper over the glass, or when the engine suction is low, as in hill climbing with wide open throttle and engine speed rendered low by the heavy work required on up-grade, the power afforded by the motor which depends for its operation on the limited amount of engine suction which may be prudently utilized when the motor is connected and arranged for deriving suction from the intake manifold, is insufficient for the task of keeping the windsheld glass clear.

And the present invention is specially designed to obviate this defect and provide means for deriving from engine pressures adequate power for operating a suction motor of the size and character of those now commonly used under the unfavorable conditions described; and to accomplish this result without drawing upon the engine force represented or indexed by the intake manifold vacuum or the other engine pressures, to any objectionable degree.

The invention consists in the elements and features of construction shown and described as indicated in the claims.

In the drawing:

Figure 1 is a diagrammatic view showing a motor vehicle having a windshield wiper equipped with the devices constituting this invention and connected with the engine for deriving suction for operating the wiper motor.

Figure 2 is a section of a cylinder of the engine with which the devices of the invention are connected showing the form and manner of the connection, section being made at the plane indicated by the line 2—2 on Figure 1.

Figure 3 is a detail section of the conduit in which suction is produced by the discharge of exhaust gases from the engine cylinder for operating the windshield wiper motor.

Figure 4 is a section at the line 4—4 on Figure 1.

One characteristic feature of this invention is the utilization of engine exhaust pressure for developing suction by pressure reduction due to the acceleration of exhaust flow at a constriction in the exhaust flow passage, and by entrainment, drawing in air in a branch duct through which the suction is utilized, the exhaust pressure and consequent velocity of exhaust flow being increased by connecting the exhaust conduit for discharge with the intake manifold in which the pressure is subatmospheric.

Another characteristic feature consists in making the connection for exhaust pressure with an individual cylinder of the engine, instead of making such connection with the exhaust manifold or with the exhaust pipe from the exhaust manifold.

These two features may be embodied together and either of them may be embodied without the other. Both are embodied in the structure illustrated in the drawing which will now be described in detail.

In the drawing the engine intake manifold is indicated at 20, and the exhaust manifold at 21. An individual cylinder of the engine is seen at 22. A conduit, 23, is shown connected with the cylinder, 22, by a coupling element, 24, screwed through the water jacket, 25, and having its terminal tapered as seen at 26, seating at a very restricted port, 27, which opens in the cylinder at a point in the course of the exhaust stroke of the piston which is reached, and the port covered by the piston, early in the exhaust stroke,—before the inertia of the gases, which in the immediately preceding power stroke have moved in the opposite or exhaust direction, is entirely overcome; so that in the portion of the exhaust stroke before the port, 27, is covered by the piston, the pressure operating for discharge through the conduit, 23, is maximum in degree, and though operating at the discharge port, 27, very briefly, operates to produce compression in the conduit, 23, reaction from which tends to maintain rapid discharge flow through the conduit throughout the interval between the exhaust strokes of the engine piston.

The coupling element, 24, has a boss, 24$^a$, intermediate its ends and is threaded at both end portions and furnished with a jam nut, 28, which is run onto the inner end threaded portion of the coupling which is seated, as described, at the port, 27, which jam nut is set up tightly against the cylinder when the coupling has first been seated tightly at the port, 27. The other threaded end portion, 24$^c$, serves for connecting the part, 24, to a chamber, 60, which is interposed between the conduit, 23, hereinabove referred to, for trapping the fluid pressure derived from the engine cylinder and constituting the discharge therefrom tending further to maintain the discharge pressure substantially continuous through the intervals between the discharge impulses corresponding to the intake strokes of the engine piston. At this outlet the chamber, 60, is connected with pipe elements constituting the conduit, 23, which thus becomes a continuation of the coupling member, 24, and thereby is connected with the engine cylinder for conducting the exhaust pressure therefrom to the engine intake manifold with which the conduit, 23, is connected, as seen at 32.

At some distance from the engine cylinder there is interposed in the conduit, 23, a fitting, 35, having a restriction in the flow passage which is preferably in Venturi form, as seen at 35$^a$.

This fitting, 35, has a laterally and obliquely protruding boss, 35$^b$, bored for connection with the flow passage at the Venturi constriction, said bore, 35$^c$, extending obliquely onward in the direction of the exhaust discharge flow. At the boss, 35$^b$, there is connected a pipe, 36, hereinafter referred to as the suction conduit, which is extended and adapted for connection with the windshield wiper motor, indicated in entirety at 50 with the suction connection shown at 51, and which may be understood to be of the familiar type having reciprocating piston or pistons actuated alternately in opposite directions by the alternation of suction and atmospheric pressure, which alternation is effected by familiar valve mechanism (not shown).

It has been well demonstrated that the suction developed by the connections described, taking the exhaust pressure from an individual cylinder, for producing suction in the well understood manner shown, without sensibly effecting the operation of the engine or the power developed thereby, exceeds the suction which can be derived from the engine manifold by any connection therewith which will not materially impair the operation of the engine.

And it has also been demonstrated that extending the connection of the exhaust conduit from the engine cylinder to the intake manifold, as shown, instead of extending it for exhaust discharge to atmosphere, very materially increases the suction conduit connected for suction, as shown, antecedent to the connection of the conduit, 23, with the intake manifold, without sensibly effecting the operation of the engine by reason of the probably slight increase of pressure in the intake manifold.

For cushioning the pulsations in the conduit, 23, which would normally result from the alternation of higher and lower pressures in the engine cylinder at the point at which the port, 27, is located, it is found desirable to provide the fluid pressure trapping and cushioning chamber, shown at 60 in Figure 2. In this chamber the higher pressure will be stored up to some extent by compression of the air therein which will react in the intervals of lower pressure with the tendency to make the pressure in the duct, 23, approximately uniform.

An important feature of the construction thus far described consists in that the flow passage, 30, in the coupling member, 24, by which an exhaust discharge current is maintained, as described, substantially continuous during engine operation, is tapered widening from the restricted port, 27, to the connection with a fluid pressure trapping and cushioning chamber, 60. This results in the expansion of the discharge gases as they move through the passage, 30, with the effect that the discharge is only very slightly impeded by friction with the walls of the passage in the discharge movement; but in the intake stroke of the engine piston tending to produce inflow through the connection, 24, this passage narrowing in the direction of such inflow tends to act with the value and effect of a check valve opening outwardly with respect to the engine cylinder and seating by reverse flow, acting thus upon the discharge gases emerging through the restricted port, 27, and expending in the taperingly enlarged passage, 30, the discharge being very slightly retarded by friction; whereas in the intake phase of the piston cycle, tending to produce back flow from the conduit, 23, into the engine cylinders, the reverse movement, tending to compress the gases in the tapered passage, is greatly impeded by the resistance to compression and the increased friction; so that practically no reverse flow will occur, while at the same time the reaction of the gases trapped and under pressure in the cushioning and trapping chamber, 30, continues to operate directly for outflow through the conduit, 23.

In view of the possibility of lubricating oil from the engine cylinder being discharged with the exhaust gases through the port, 26, and being found in the conduit, 23, and the further possibility of water from the cylinder jacket passing the supposedly snugly seated terminal of the coupling member, 24, and reaching the flow passage, 30, and the remainder of the conduit, 23, it is considered advisable to provide for getting such oil and water out of the conduit, 23, preventing it from reaching the apparatus, of whatever character, to which the fluid pressure is being led for the purpose of the construction; and for the purpose of thus eliminating the oil and water from the conduit, there is provided a liquid trapping chamber, 40, which, in the construction illustrated, is shown connected at the under side of the cushioning and fluid pressure trapping chamber, 60, so that the oil and water, if any, carried by the fluid pressure flow through the passage, 30, will be readily separated by gravity from the gaseous current and collected in the liquid trapping chamber and drained therefrom from time to time through the drain cock, 41, with which that chamber is provided at the lower end.

For convenience of thus draining the liquid trapping chamber without releasing or venting the fluid pressure which may be operative in the fluid pressure conduit and the chamber, 60, thereof, a shut-off valve, 42, may be interposed in the connection between the fluid pressure trapping chamber, 60, and the liquid trapping chamber 40. And in order that the liquid in the chamber, 40, may not be air bound when the valve, 42, is closed, this valve is formed, as seen in Figure 4, to afford an air vent 43 when it is at closed position.

It is considered desirable to cool as much as possible the exhaust gases which constitute the fluid pressure current derived from the engine cylinder and to effect this cooling as early as possible in the course of the flow of the gases from the engine cylinder; and for this purpose the cushioning and fluid pressure trapping chamber, 60, is desirably formed with exterior radiating ribs or fins, 61, over its entire outer surface.

I claim:

1. In combination with a multiple cylinder internal combustion engine and a suction-operated motor for actuating an auxiliary device associated with the mechanism served by the engine, a conduit connected with an individual cylinder of the engine at a point early in the course of the exhaust stroke of the piston and extended for discharge in a region of lower pressure, said conduit having a flow-accelerating constriction with an inlet port proximate to said constriction, and a relatively slender conduit connected at said inlet extending and adapted for operative suction connection with the suction-operated motor.

2. In the construction defined in claim 1, the connection of the first mentioned conduit with the engine cylinder being made through the water jacket of the cylinder and comprising a coupling member screwed into the engine cylinder extending across the water jacket and having a tapered terminal for seating at a port opening in the inner cylinder wall; said coupling member having an operating boss intermediate its ends; a jam nut on the coupling member inwardly from said boss seating against the outer wall of the cylinder jacket to hold the coupling member seated at the inner end at said port in the inner wall, and a pipe coupling element screwed onto the outer end of said coupling member.

3. In combination with a multiple cylinder internal combustion engine, means for deriving exhaust pressure flow for operating an auxiliary device, consisting of a fluid flow conduit comprising a duct member connected for fluid pressure flow with an individual cylinder of the engine, the engine cylinder having a restricted aperture constituting a discharge port located at a point early in the course of the exhaust stroke of the piston, the duct member being inserted across the water jacket for registering its intake with said restricted aperture, and being tapered enlarging from its registered end outward and connected at its outer end for conducting the discharge gases to a place and means for utilizing the discharge pressure.

4. In combination with the construction defined in claim 3, a fluid pressure trapping and cushioning chamber interposed in the fluid pressure discharge line beyond the tapering entrance passage thereof for maintaining the discharge movement in the interval between the discharge impulses.

5. In combination with a multiple cylinder internal combustion engine and a suction-operated motor for actuating an auxiliary device associated with the mechanism served by the engine, a conduit connected with an individual cylinder of the engine at a point early in the course of the exhaust stroke of the piston, said conduit being extended and connected for discharge in the engine intake manifold; said conduit having a flow accelerating constriction with an inlet port proximate to said constriction and a relatively slender conduit connected at said inlet extending and adapted for operative suction connection with the suction-operated motor.

6. The construction defined in claim 1, the engine-cylinder-connected conduit having communication with it at a point intermediate the connection of said conduit with the engine cylinder and the flow accelerating constriction, a closed chamber for cushioning the pulsations due to alternating higher and lower pressures at the engine cylinder connection.

In testimony whereof, I have hereunto set my hand at Chicago, Illinois, this 26th day of February, 1931.

WILLIAM A. EDWARDS.